Aug. 21, 1928.

H. H. STEINMAN 1,681,443

ANTIFROST DEVICE FOR WINDOWS

Filed Feb. 15 1926

Inventor

Harry H. Steinman

By
Attorney

Patented Aug. 21, 1928.

1,681,443

UNITED STATES PATENT OFFICE.

HARRY H. STEINMAN, OF ST. PAUL, MINNESOTA.

ANTIFROST DEVICE FOR WINDOWS.

Application filed February 15, 1926. Serial No. 88,306.

REISSUED

The present invention relates to an antifrost device for a window.

An object of the invention is to make a separable frame having a flexible sealing member gripped intermediate the edges of said frame to contact with a surface against which the frame is positioned, and having vacuum cups removably connected to the device for fastening it to a smooth surface, the frame being demountable to permit interchanging a thin transparent sheet positioned therein and inserting other sheets of substantially equal thickness in lieu thereof.

In order to attain this object, there is provided, in accordance with the one feature of the invention, a pair of frame members stamped from thin sheet metal insertable one within the other, and a strip of flexible material, such as rubber, gripped between the edges of said frames. A transparent sheet is positioned intermediate the frames to be gripped thereby, and a pair of vacuum cups are connected to the frames to hold the frames in position and grip the transparent sheet between said frames.

Figure 1:
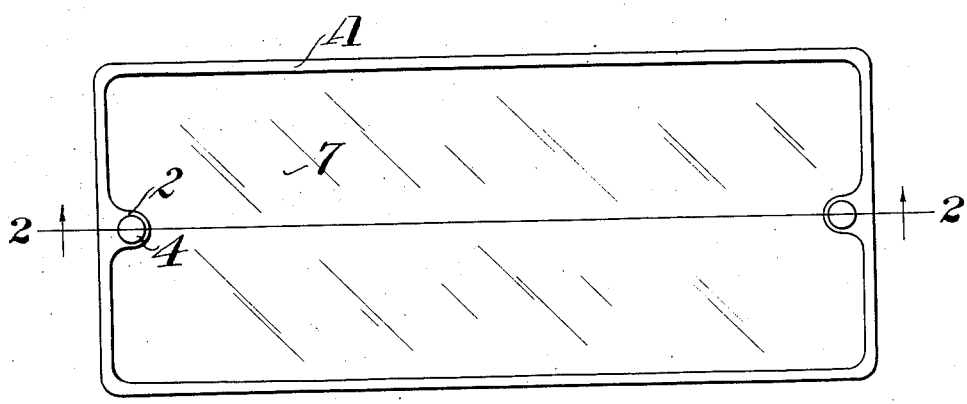
Figure 2:
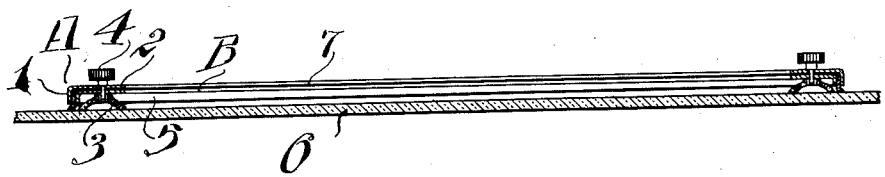

These and other features of the invention, not specifically mentioned, will be more fully brought out in the following description and accompanying drawings, wherein:

Figure 1, is a view in top elevation of a device made in accordance with the present invention; and Figure 2, is a view in section on the line 2—2 of Figure 1.

Referring to the drawings in detail, a frame A is formed of sheet metal such as aluminum, and is provided with a turned down flange 1 surrounding the outer edge thereof. A projection 2 extends inwardly on each side of the frame and is penetrated by a hole, not shown, to receive a vacuum cup 3 having a thumb screw 4 threadedly connected thereto. A second frame B is provided of similar shape and construction and having a central opening corresponding to the central opening in the outer frame A, but having a downturned flange 5 thereof of a size to fit within the downturned flange of the outer frame A.

Between the downturned flange 1 of the outer frame and the downturned flange 5 of the inner frame, is gripped a strip of suitable flexible material, such as rubber, to extend downwardly below the flanges 1 and 5 to form a seal between the frames and a plate of glass 6, upon which the device is mounted.

Before the frames are assembled in the positions illustrated, a sheet of celluloid 7, or other suitable material, is inserted between the frames, so that when the frames are drawn to the position illustrated and the thumb screws 4 are turned down to grip the frames tightly, the sheet 7 is gripped firmly between the two frames to hold it in position.

If desired, the transparent sheet 7 may be removed from the frame and replaced by a sheet of amber colored transparent material, not shown, to form a glare shield to protect the eyes of a driver from the glare of approaching headlights, or the rays of the sun, or said transparency may be replaced by a sheet of cardboard, not shown, bearing an advertisement or other desired indicia thereon.

I claim:

1. A device of the character described, comprising a pair of frames insertable one within the other, each of said frames being provided with a downturned flange around the outer edge thereof, a strip of flexible material positioned intermediate said flanges to be held in position thereby, and a pair of vacuum cups removably connected to said frames and having means thereon to draw the frames into proximity with each other to grip a sheet of material between said frames and to hold it in position in said frames.

2. An anti-frost shield, comprising a pair of sheet metal frame members separably connected, a flexible sealing strip gripped between said frame members to engage a surface upon which the device is mounted, a transparent sheet gripped between the frame members to be held in position thereby, and a pair of vacuum cups carried by said frame to connect the device to a smooth surface.

In testimony whereof I affix my signature.

HARRY H. STEINMAN.